(12) United States Patent
Laskey et al.

(10) Patent No.: US 10,424,129 B2
(45) Date of Patent: Sep. 24, 2019

(54) TIRE CONDITION TELEMATICS SYSTEM

(71) Applicant: Dana Heavy Vehicle Systems Group, LLC, Maumee, OH (US)

(72) Inventors: Ryan W. Laskey, Lambertville, MI (US); Douglas D. Turner, Holland, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 120 days.

(21) Appl. No.: 15/471,875

(22) Filed: Mar. 28, 2017

(65) Prior Publication Data

US 2017/0278314 A1 Sep. 28, 2017

Related U.S. Application Data

(60) Provisional application No. 62/313,852, filed on Mar. 28, 2016.

(51) Int. Cl.
| | |
|---|---|
| *G07C 5/00* | (2006.01) |
| *G07C 5/08* | (2006.01) |
| *B60C 11/24* | (2006.01) |
| *B60C 23/04* | (2006.01) |
| *G06Q 30/06* | (2012.01) |
| *H04L 29/08* | (2006.01) |

(52) U.S. Cl.
CPC .............. *G07C 5/008* (2013.01); *B60C 11/24* (2013.01); *B60C 11/243* (2013.01); *B60C 11/246* (2013.01); *B60C 23/0408* (2013.01); *B60C 23/0479* (2013.01); *B60C 23/0484* (2013.01); *G06Q 30/0611* (2013.01); *G07C 5/085* (2013.01); *G07C 5/0808* (2013.01); *H04L 67/10* (2013.01)

(58) Field of Classification Search
None
See application file for complete search history.

(56) References Cited

U.S. PATENT DOCUMENTS

| | | |
|---|---|---|
| 6,281,787 B1 | 8/2001 | Lerg et al. |
| 7,019,628 B2 | 3/2006 | Ichinose |
| 7,423,522 B2 | 9/2008 | O'Brien et al. |

(Continued)

FOREIGN PATENT DOCUMENTS

| | | |
|---|---|---|
| EP | 2777957 A2 | 9/2014 |
| EP | 2995474 A1 | 3/2016 |

(Continued)

OTHER PUBLICATIONS

European Patent Office, International Search Report with Written Opinion Issued in Application EP17163392.8 dated Jul. 27, 2017, 8 pages, Munich.

*Primary Examiner* — Rami Khatib
(74) *Attorney, Agent, or Firm* — Marshall & Melhorn, LLC

(57) ABSTRACT

A tire condition telematics system. The system includes a vehicle having an onboard computer and one or more wheel assemblies with one or more tires with a tire tread. A prediction as to when said tire tread will fall below a minimum tread depth in performed. The prediction is based on an amount of distance said wheel assemblies experience said wheel slip condition, a distance said wheel assemblies drive over said one or more road materials, a distance said wheel assemblies drive in rain and snow, a distance one or more loads are on said vehicle.

14 Claims, 3 Drawing Sheets

(56) References Cited

U.S. PATENT DOCUMENTS

| | | | |
|---|---|---|---|
| 9,478,080 B2 | 10/2016 | Corriere et al. | |
| 9,527,351 B2 | 12/2016 | Hsu et al. | |
| 2002/0044051 A1* | 4/2002 | Sugisawa | B60C 23/00 340/442 |
| 2005/0280522 A1* | 12/2005 | Verrier | B60C 23/0408 340/442 |
| 2006/0122747 A1* | 6/2006 | Brown, Jr. | B60C 23/0408 701/31.4 |
| 2011/0163865 A1* | 7/2011 | Liberge | B60C 23/0401 340/442 |
| 2012/0136802 A1 | 5/2012 | McQuade et al. | |
| 2013/0274988 A1* | 10/2013 | Reynes | B60C 23/0408 701/29.4 |
| 2014/0229316 A1* | 8/2014 | Brandon | G06Q 50/30 705/26.4 |
| 2014/0277910 A1* | 9/2014 | Suh | B60C 23/02 701/31.4 |
| 2015/0032357 A1* | 1/2015 | Dudar | F02D 41/021 701/103 |
| 2015/0239307 A1 | 8/2015 | Horikoshi et al. | |

FOREIGN PATENT DOCUMENTS

| | | |
|---|---|---|
| WO | 0244957 A1 | 6/2002 |
| WO | 2012167357 A1 | 12/2012 |
| WO | 2015019291 A1 | 2/2015 |
| WO | 2015052439 A1 | 4/2015 |

\* cited by examiner

TIRE CONDITION TELEMATICS SYSTEM

CROSS-REFERENCE TO RELATED APPLICATIONS

The present application claims the benefit to U.S. Provisional Patent Application No. 62/313,852 filed on Mar. 28, 2016, which is incorporated herein by reference in its entirety.

FIELD OF THE DISCLOSURE

The present disclosure relates to a smart driveline for a vehicle having a tire condition telematics system.

BACKGROUND OF THE DISCLOSURE

It is well known that the cost of tires for a commercial vehicle, or a fleet of commercial vehicles, is often one of the most expensive costs associated with operating the vehicle. Typically, only the cost of fuel exceeds the costs associated with the tires for a commercial vehicle. In light of the high operating costs associated with commercial vehicle tires, there is a lot of interest within the industry, and especially from commercial vehicle owners, to maintain the tires at their optimum condition so they last as long as possible, thereby reducing the overall costs associated with commercial vehicle tires.

In addition, commercial vehicle owners want to keep their vehicles on the road as much as possible with as little down time as possible. Any time the vehicles are not on the road typically means that they are not earning money. While regular maintenance is an important part in ensuring vehicles have a long service life, unplanned maintenance can be extremely disruptive for the vehicle owner in terms of the amount of time and money lost. It is therefore desirable to keep unplanned maintenance, including unplanned tire maintenance, to a minimum.

Furthermore, it is to the advantage of the owner and/or the operator of the vehicle to obtain the lowest cost possible in relation to any required vehicle maintenance. However, obtaining the lowest cost for work can be a very time consuming effort, as it often requires the owner and/or the operator of the vehicle to contact multiple entities, wait for their response, compare the various quotes to one another and then schedule a time for when the maintenance will occur. It would therefore be advantageous to provide the vehicle owner and/or the vehicle operator with a system that will provide them with real-time quotes for maintenance issues so the owner and/or operator can quickly ascertain which one is the best deal in terms of time, money and the quality of work to be performed.

SUMMARY OF THE DISCLOSURE

A tire condition telematics system. The system includes a vehicle having an onboard computer and one or more wheel assemblies with one or more tires with a tire tread. A prediction as to when said tire tread will fall below a minimum tread depth in performed. The prediction is based in part on an amount of distance said wheel assemblies experience said wheel slip condition, a distance said wheel assemblies drive over said one or more road materials, a distance said wheel assemblies drive in rain and snow, a distance one or more loads are on said vehicle, an amount of braking force applied by one or more braking systems to said wheel assemblies and a speed of said vehicle when said braking force is applied.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It is within the scope of this disclosure, and as a non-limiting example, that the tire condition telematics system disclosed herein may be used in automotive, off-road vehicle, all-terrain vehicle, construction, structural, marine, aerospace, locomotive, military, machinery, robotic and/or consumer product applications. Additionally, as a non-limiting example, the tire condition telematics system disclosed herein may also be used in passenger vehicle, electric vehicle, hybrid vehicle, commercial vehicle, autonomous vehicles, semi-autonomous vehicles and/or heavy vehicle applications.

Figure 1:
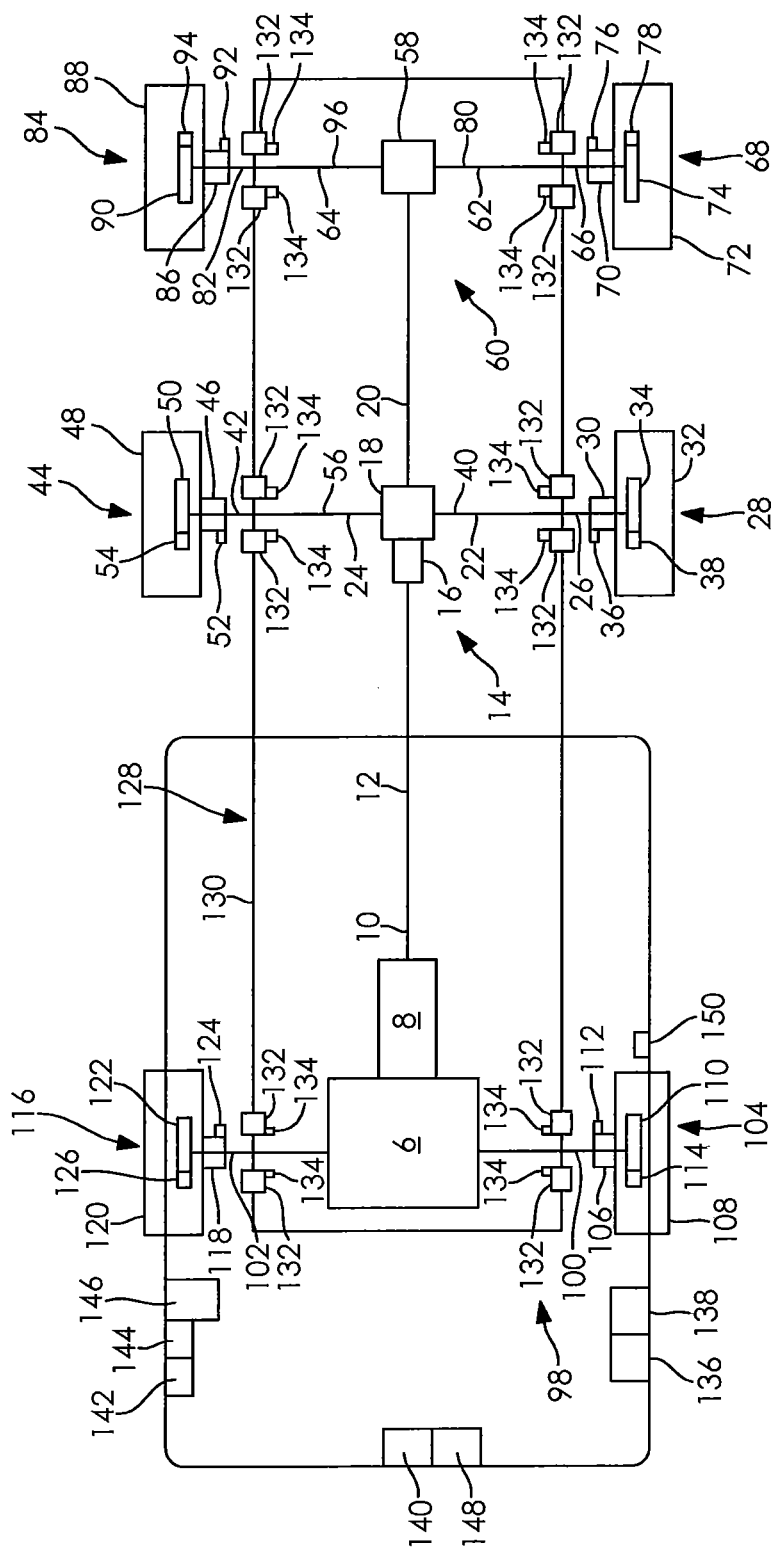
FIG. 1 is a schematic top-plan view of a vehicle having a tire condition system telematics system according to an embodiment of the disclosure.

FIG. 1 is a schematic top-plan view of one or more vehicles 2 having a tire condition telematics system 4 according to an embodiment of the disclosure. The one or more vehicles 2 have an engine 6 which is drivingly connected to a transmission 8. A transmission output shaft 10 is then drivingly connected to an end of the transmission 8 opposite the engine 6. The transmission 8 is a power management system which provides controlled application of the rotational power generated by the engine 6 by means of a gear box.

An end of the transmission output shaft 10 opposite the transmission 8 is drivingly connected to an end of a first propeller shaft 12. The first propeller shaft 12 extends from the transmission output shaft 10 to a forward tandem axle system 14 having an inter-axle differentia 16. The first propeller shaft 12 may be connected to the inter-axle differential 16 through one or more of the following components (not shown) a drive shaft, a stub shaft, a coupling shaft, a forward tandem axle system input shaft, a pinion gear shaft, an inter-axle differential pinion gear shaft and/or an inter-axle differential input shaft. The inter-axle differential 16 is a device that divides the rotational power generated by the engine 6 between the axles in the one or more vehicles 2. The rotational power is transmitted through the forward tandem axle system 14 as described in more detail below.

As illustrated in FIG. 1 of the disclosure, the inter-axle differential 16 is drivingly connected to a forward tandem axle differential 18 and a forward tandem axle system output shaft 20. The forward tandem axle differential 18 is a set of gears that allows the outer drive wheel(s) of the one or more wheeled vehicles 2 to rotate at a faster rate than the inner drive wheel(s).

The forward tandem axle system 14 further includes a first forward tandem axle half shaft 22 and a second forward tandem axle half shaft 24. The first forward tandem axle half shaft 22 extends substantially perpendicular to the first propeller shaft 12. A first end 26 of the first forward tandem axle half shaft 22 is drivingly connected to a first forward tandem axle wheel end assembly 28. As illustrated in FIG. 1 of the disclosure, the first forward tandem axle wheel end assembly 28 includes a first forward tandem axle tire inflation and tire monitoring system 30, a first forward tandem axle wheel assembly 32 and a first forward tandem axle braking system 34. In accordance with an embodiment of the disclosure, the first forward tandem axle tire inflation and tire monitoring system 30 includes one or more pressure sensors 36 and the first forward tandem axle braking system 34 includes one or more brake force sensors 38. A second end 40 of the first forward tandem axle half shaft 22 is drivingly connected to an end of the forward tandem axle differential 18 of the forward tandem axle system 14 of the one or more vehicles 2. As a non-limiting example, the second end 40 of the first forward tandem axle half shaft 22 is drivingly connected to a forward tandem axle differential side gear, a separate stub shaft, a separate coupling shaft, a first forward tandem axle half shaft axle disconnect system, a first forward tandem axle differential output shaft and/or a shaft that is formed as part of a forward tandem axle differential side gear.

Extending substantially perpendicular to the first propeller shaft 12 is the second forward tandem axle half shaft 24. A first end 42 of the second forward tandem axle half shaft 24 is drivingly connected to a second forward tandem axle wheel end assembly 44. As illustrated in FIG. 1 of the disclosure, the second forward tandem axle wheel end assembly 44 includes a second forward tandem axle tire inflation and tire monitoring system 46, a second forward tandem axle wheel assembly 48 and a second forward tandem axle braking system 50. In accordance with an embodiment of the disclosure, the second forward tandem axle tire inflation and tire monitoring system 46 includes one or more pressure sensors 52 and the second forward tandem axle braking system 50 includes one or more brake force sensors 54. A second end 56 of the second forward tandem axle half shaft 24 is drivingly connected to an end of the forward tandem axle differential 18 opposite the first forward tandem axle half shaft 22 of the one or more vehicles 2. As a non-limiting example, the second end 56 of the second forward tandem axle half shaft 24 is drivingly connected to a forward tandem axle differential side gear, a separate stub shaft, a separate coupling shaft, a second forward tandem axle half shaft axle disconnect system, a second forward tandem axle differential output shaft and/or a shaft that is formed as part of a forward tandem axle differential side gear.

One end of the forward tandem axle system output shaft 20 is drivingly connected to a side of the inter-axle differential 16 opposite the first propeller shaft 12. The forward tandem axle system output shaft 20 extends from the forward tandem axle system 20 to a rear tandem axle differential 58 of a rear tandem axle system 60. As illustrated in FIG. 1 of the disclosure, the end of the forward tandem axle system output shaft 20 opposite the forward tandem axle system 14 is drivingly connected to the rear tandem axle differential 58. The forward tandem axle system output shaft 20 may be connected to the rear tandem axle differential 58 though one or more of the following components (not shown) a drive shaft, a propeller shaft, a stub shaft, a coupling shaft, a rear tandem axle system input shaft, a pinion gear shaft and/or a rear tandem axle differential input shaft. The rear tandem axle differential 58 is a set of gears that allows the outer drive wheel(s) of the one or more wheeled vehicles 2 to rotate at a faster rate than the inner drive wheel(s). The rotational power is transmitted through the rear tandem axle system 60 as described in more detail below.

The rear tandem axle system 60 further includes a first rear tandem axle half shaft 62 and a second rear tandem axle half shaft 64. The first rear tandem axle half shaft 62 extends substantially perpendicular to the forward tandem axle output shaft 20. A first end 66 of the first rear tandem axle half shaft 62 is drivingly connected to a first rear tandem axle wheel end assembly 68. As illustrated in FIG. 1 of the disclosure, the first rear tandem axle wheel end assembly 68 includes a first rear tandem axle tire inflation and tire monitoring system 70, a first rear tandem axle wheel assembly 72 and a first rear tandem axle braking system 74. In accordance with an embodiment of the disclosure, the first rear tandem axle tire inflation and tire monitoring system 70 includes one or more pressure sensors 76 and the first rear tandem axle braking system 74 includes one or more brake force sensors 78. A second end 80 of the first rear tandem axle half shaft 62 is drivingly connected to an end of the rear tandem axle differential 58 of the rear tandem axle system 60 of the one or more vehicles 2. As a non-limiting example, the second end 80 of the first rear tandem axle half shaft 62 is drivingly connected to a rear tandem axle differential side gear, a separate stub shaft, a separate coupling shaft, a first rear tandem axle half shaft axle disconnect system, a first rear tandem axle differential output shaft and/or a shaft that is formed as part of a rear tandem axle differential side gear.

Extending substantially perpendicular to the first forward tandem axle output shaft 20 is the second rear tandem axle half shaft 64. A first end 82 of the second rear tandem axle half shaft 64 is drivingly connected to a second rear tandem axle wheel end assembly 84. As illustrated in FIG. 1 of the disclosure, the second rear tandem axle wheel end assembly 84 includes a second rear tandem axle tire inflation and tire monitoring system 86, a second rear tandem axle wheel assembly 88 and a second rear tandem axle braking system 90. In accordance with an embodiment of the disclosure, the second rear tandem axle tire inflation and tire monitoring system 86 includes one or more pressure sensors 92 and the second rear tandem axle braking system 90 includes one or more brake force sensors 94. A second end 96 of the second rear tandem axle half shaft 64 is drivingly connected to an end of the rear tandem axle differential 58 opposite the first rear tandem axle half shaft 62 of the one or more vehicles 2. As a non-limiting example, the second end 96 of the second forward tandem axle half shaft 64 is drivingly connected to a rear tandem axle differential side gear, a separate stub shaft, a separate coupling shaft, a second rear tandem axle half shaft axle disconnect system, a second rear tandem axle differential output shaft and/or a shaft that is formed as part of a rear tandem axle differential side gear.

As illustrated in FIG. 1 of the disclosure, the one or more vehicles 2 further include a front axle system 98 having an axle housing 100 having a first end portion 102 and a second end portion 104. At least a portion of the first end portion 100 of the front axle system 98 is drivingly connected to a first front axle wheel end assembly 104 having a first front axle tire inflation and tire monitoring system 106, a first front axle wheel assembly 108 and a first front axle braking system 110. In accordance with the embodiment of the disclosure, the first front axle tire inflation and tire monitoring system 106 includes one or more pressure sensors 112 and the first front axle braking system 110 includes one or more brake force sensors 114.

At least a portion of the second end portion 102 of the front axle system 98 is drivingly connected to a second front axle wheel end assembly 116 having a second front axle tire inflation and tire monitoring system 118, a second front axle wheel assembly 120 and a second front axle braking system 122. In accordance with the embodiment of the disclosure, the second front axle tire inflation and tire monitoring system 118 includes one or more pressure sensors 124 and the second front axle braking system 122 includes one or more brake force sensors 126.

According to the embodiment of the disclosure illustrated in FIG. 1, the one or more vehicles 2 further include an air suspension system 128 that is fluidly connected to one or more air supplies (not shown). The air suspension system 128 includes a chassis 130 that is integrally connected to at least a portion of the front axle system 98, the forward tandem axle system 14 and/or the rear tandem axle system 60 of the one or more vehicles 2. Additionally, as illustrated in FIG. 1, the air suspension system 128 includes one or more air suspension bags 132 disposed on either side of the front axle system 98, the forward tandem axle system 14 and/or the rear tandem axle system 60 of the one or more vehicles 2. In accordance with an embodiment of the disclosure, one or more of the one or more air suspension bags 132 may include one or more pressure sensors 134. The one or more pressure sensors 134 of the air suspension system 128 are used to determine the overall weight of the load the one or more vehicles 2 are hauling by determining the increase in pressure within the one or more air suspension bags 132 after a load has been applied. According to an embodiment of the disclosure, the one or more pressure sensors 134 of the air suspension system 128 are in communication with an onboard computer 136 having one or more data processors and/or an onboard telematics unit 138 by using an onboard J-1939 communication network (not shown). In accordance with an alternative embodiment of the disclosure, one or more pressure sensors 134 of the air suspension system 128 are in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The tire inflation and tire monitoring systems 30, 46, 70, 86, 106 and 118 are fluidly connected to one or more air supplies (not shown) and are fluidly connected to the wheel assemblies 32, 48, 72, 88, 108 and 120 of the one or more vehicles 2. It is within the scope of this disclosure that the air supply (not shown) for the tire inflation and tire monitoring systems 30, 46, 70, 86, 106 and 118 may be the same air supply as used in connection with the one or more air suspension bags 132. Additionally, the tire inflation and tire monitoring systems 30, 46, 70, 86, 106 and 118 of the one or more vehicles 2 are in communication with the onboard computer 136 and/or to the onboard telematics unit 138 of the one or more vehicles 2. According to an embodiment of the disclosure, the tire inflation and tire monitoring systems 30, 46, 70, 86, 106 and 118 are in communication with the onboard computer 136 and/or the onboard telematics unit 138 of the one or more vehicles 2 by using the onboard J-1939 communication network (not shown). In accordance with an alternative embodiment of the disclosure, the tire inflation and tire monitoring systems 30, 46, 70, 86, 106 and 118 of the one or more vehicles 2 are in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The onboard computer 136 monitors the internal pressure within the wheel assemblies 32, 48, 72, 88, 108 and 120 by analyzing the data received from the one or more pressure sensors 38, 52, 76, 92, 112 and 124 of the tire inflation and tire monitoring systems 30, 46, 70, 86, 106 and 118. According to an embodiment of the disclosure, the onboard computer 136 may continuously monitor the internal pressure of the wheel assemblies 32, 48, 72, 88, 108 and 120. In accordance with an alternative embodiment of the disclosure, the onboard computer 136 may check the internal pressure of the wheel assemblies 32, 48, 72, 88, 108 and 120 at pre-determined intervals. As a non-limiting example, onboard computer 136 may check the internal pressure of the wheel assemblies 32, 48, 72, 88, 108 and 120 every five minutes, ten minutes, fifteen minutes, thirty minutes or every hour.

According to a an additional embodiment of the disclosure, the tire inflation systems 30, 46, 70, 86, 106 and 118 of the one or more vehicles 2 may also be used to detect a leak in one or more of the wheel assemblies 32, 48, 72, 88, 108 and 120. As a non-limiting example, the onboard computer 136 of the one or more vehicles 2 may detect the existence of a leak by identifying a sudden drop in internal pressure within one or more of the wheel assemblies 32, 48, 72, 88, 108 and 120. In addition, the onboard computer 136 of the one or more vehicles 2 may also determine how strong and/or weak the leak is within one or more of the wheel assemblies 32, 48, 72, 88, 108 and 120 of the one or more vehicles 2 by monitoring the rate of the leak over time. Furthermore, it is within the scope of this disclosure, that the onboard computer 136 of the one or more vehicles 2 may predict when the internal pressure within the one or more of the wheel assemblies 32, 48, 72, 88, 108 and 120 will fall below a pre-determined minimum air pressure by monitoring the rate of the leak over time. Depending on how strong the leak is and/or if there is a sudden change in the rate of the leak, the onboard computer 136 of the one or more vehicles 2 can determine if the leak is due to a tire puncture event requiring immediate repair.

Upon the detection of a leak within one or more of the wheel assemblies 32, 48, 72, 88, 108 and 120, the onboard computer 136 may send a message to the vehicle operator (not shown) and/or vehicle owner (not shown) indicating the existence of a leak within one or more of the wheel assemblies 32, 48, 72, 88, 108 and 120. The message (not shown) alerts the vehicle operator (not shown) and/or the vehicle owner (not shown) that one or more of the tires of the wheel assemblies 32, 48, 72, 88, 108 and 120 is leaking. As a non-limiting example the message may be text based message, a graphical message, an indicator light and/or an audible sound within the cab (not shown) of the one or more vehicles 2. It is within the scope of this disclosure that the message may indicate how strong and/or weak the leak is, which wheel assembly has the leak, if due to the leak the wheel assembly will require immediate repair and/or replacement, if the leak is due to a tire puncture event and/or how long until the internal pressure of the wheel assembly will fall below the pre-determined minimum air pressure. This will inform the vehicle operator (not shown) and/or the vehicle owner (not shown) when the one or more vehicles 2 will need to go in to have one or more of the wheel assemblies 32, 48, 72, 88, 108 and 120 repaired and/or replaced.

Furthermore, one or more pressure sensors 38, 52, 76, 92, 112 and 124 of the tire inflation and tire monitoring systems 30, 46, 70, 86, 106 and 118 are used to determine how much time one or more of the wheel assemblies 32, 48, 72, 88, 108 and 120 are driven at a lower than optimal tire pressure. When the wheel assemblies 32, 48, 72, 88, 108 and 120 are driven at a lower than optimal tire pressure, the tires of the wheel assemblies 32, 48, 72, 88, 108 and 120 wear at a faster rate. As a result, the amount of time one or more of the wheel assemblies 32, 48, 72, 88, 108 and 120 are driven at a lower than optimum tire pressure, may be used by the onboard computer 136 to predict when a tire failure will occur, when tire maintenance will be needed and/or when one or more tires of the wheel assemblies 32, 48, 72, 88, 108 and 120 will require replacing.

As previously discussed, the braking systems 34, 50, 74, 90, 110 and 122 includes one or more brake force sensors 38, 54, 78, 94, 114 and 126. One or more of the one or more brake force sensors 38, 54, 78, 94, 114 and 126 of the braking systems 34, 50, 74, 90, 110 and 122 may be used to determine the amount of braking force applied to one or more of the wheel assemblies 32, 48, 72, 88, 108 and 120 by the braking systems 34, 50, 74, 90, 110 and 122. The one or more brake force sensors 38, 54, 78, 94, 114 and 126 of the braking systems 34, 50, 74, 90, 110 and 122 are in communication with the onboard computer 138 and/or the onboard telematics unit 138 of the one or more vehicles 2. According to an embodiment of the disclosure, the one or more brake force sensors 38, 54, 78, 94, 114 and 126 of the braking systems 34, 50, 74, 90, 110 and 122 are in communication with the onboard computer 136 and/or the onboard telematics unit 138 of the one or more vehicles 2 by using the onboard J-1939 communication network (not shown). In accordance with an alternative embodiment of the disclosure, the one or more brake force sensors 38, 54, 78, 94, 114 and 126 of the one or more vehicles 2 are in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The onboard computer 136 monitors the amount of braking force applied to the one or more of the wheel assemblies 32, 48, 72, 88, 108 and 120 by the braking systems 34, 50, 74, 90, 110 and 122 by analyzing the data received from one or more of the one or more of the brake force sensors 38, 54, 78, 94, 114 and 126 over time. According to an embodiment of the disclosure, the onboard computer 136 may average the amount of braking force measured by the one or more brake force sensors 38, 54, 94, 114 and 126 in order to determine the average amount of braking force applied one or more of the wheel assemblies 32, 48, 72, 88, 108 and 120 by the braking systems 34, 50, 74, 90, 110 and 122. The amount of braking force applied to the one or more of the wheel assemblies 32, 48, 72, 88, 108 and 120 by the braking systems 34, 50, 74, 90, 110 and 122 may be used to determine the amount of friction experienced between the wheel assemblies 32, 48, 72, 88, 108 and 120 and the road (not shown). The amount of friction between the wheel assemblies 32, 48, 72, 88, 108 and 120 and the road (not shown) over time may be used by the onboard computer 136 to predict when a tire failure will occur, when tire maintenance will be needed and/or when one or more tires of the wheel assemblies 32, 48, 72, 88, 108 and 120 will require replacing.

As illustrated in FIG. 1 of the disclosure, the one or more vehicles 2 further includes a lane tracking system 140 that is in, communication with the onboard computer 136. According to an embodiment of the disclosure, the lane tracking system 140 is in communication with the onboard computer 136 and/or the onboard telematics unit 138 of the one or more vehicles 2 by using the onboard J-1939 communication network (not shown). In accordance with an alternative embodiment of the disclosure, the lane tracking system 140 is in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The lane tracking system 140 is used to determine how much time the one or more vehicles 2 spend changing lanes (not shown). The amount of time spent changing lanes (not shown) may be used to provide a more accurate estimation of how many miles the one or more vehicles 2 have traveled over a period of time. Additionally, the lane tracking system 140 of the one or more vehicles 2 may also be used to determine the type of road material the one or more vehicles 2 have been driving on and how long the one or more vehicles 2 have driven on each type of road material time. As a non-limiting example, the lane tracking system 140 is able to identify whether the one or more vehicles 2 are driving over a concrete road, an asphalt road and/or a gravel road. The type of road material and the amount of time the one or more vehicles 2 have driven on each type of road material in combination with the amount of braking force applied to the one or more of the wheel assemblies 32, 48, 72, 88, 108 and 120 by the braking systems 34, 50, 74, 90, 110 and 122, is used to determine the amount of friction experienced between the wheel assemblies 32, 48, 72, 88, 108 and 120 and the road (not shown). This will aid in providing a more accurate prediction as to when a tire failure will occur, when tire maintenance will be needed and/or when one or more tires of the wheel assemblies 32, 48, 72, 88, 108 and 120 will require replacing.

Additionally, as illustrated in FIG. 1 of the disclosure, the one or more vehicles 2 include a tire traction system 142 and one or more wiper system sensors 144. According to an embodiment of the disclosure, the tire traction system 142 and the one or more wiper system sensors 144 are in communication with the onboard computer 136 and/or the onboard telematics unit 138 of the one or more vehicles 2 by using the onboard J-1939 communication network (not shown). In accordance with an alternative embodiment of the disclosure, the tire traction system 142 and the one or more wiper system sensors 144 are in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The tire traction system 142 is used to determine the frequency of and how much time the one or more vehicles 2 experience a wheel slip condition. When the one or more vehicles 2 experience a wheel slip condition, the amount of friction between one or more of the wheel assemblies 32, 48, 72, 88, 108 and 120 and the road (not shown) decreases thereby decreasing the amount of wear on the tires of the wheel assemblies 32, 48, 72, 88, 108 and 120. This will aid in providing a more accurate prediction as to when a tire failure will occur, when tire maintenance will be needed and/or when one or more tires of the wheel assemblies 32, 48, 72, 88, 108 and 120 will require replacing.

The one or more wiper system sensors 144 are used to determine how much time the one or more vehicles 2 spends in the rain and/or the snow. When the one or more vehicles 2 are driving in the rain and/or the snow, the amount of friction between one or more of the wheel assemblies 32, 48, 72, 88, 108 and 120 and the road (not shown) decreases thereby decreasing the amount of wear on the tires of the wheel assemblies 32, 48, 72, 88, 108 and 120. It is within the scope of this disclosure that the speed of the windshield wipers (not shown) sensed by the one or more wiper system sensors 144 may be leveraged. The speed of the windshield wipers (not shown) may be used to provide a more accurate determination of how much the amount of friction between one or more of the wheel assemblies 32, 48, 72, 88, 108 and 120 and the road (not shown) has been decreased by the rain and/or snow. These factors may be utilized by the onboard computer 136 of the one or more vehicles 2 to further aid in providing a more accurate prediction as to when a tire failure will occur, when tire maintenance will be needed and/or when one or more tires of the wheel assemblies 32, 48, 72, 88, 108 and 120 will require replacing.

As illustrated in FIG. 1 of the disclosure, the one or more vehicles 2 further include a HVAC system 146. According to an embodiment of the disclosure, the HVAC system 146 is in communication with the onboard computer 136 and/or the onboard telematics unit 138 of the one or more vehicles 2 by using the onboard J-1939 communication network (not shown). In accordance with an alternative embodiment of the disclosure, the HVAC system 146 is in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The HVAC system 146 is used to determine an ambient temperature, an amount of time the one or more vehicles 2 are driving in a given ambient temperature and an amount of a solar load on the one or more vehicles 2. The higher the ambient temperature the one or more vehicles 2 are driving in, the increased the amount of grip between the tires of the wheel assemblies 32, 48, 72, 88, 108 and 120 and the road (not shown) thereby increasing the rate at which the tires of the wheel assemblies 32, 48, 72, 88, 108 and 120 will wear. Additionally, the lower the ambient temperature the one or more vehicles 2 are driving in, the lower the amount of grip between the tires of the wheel assemblies 32, 48, 72, 88, 108 and 120 and the road (not shown) thereby decreasing the rate at which the tires will wear. This factor will aid in providing a more accurate prediction as to when a tire failure will occur, when tire maintenance will be needed and/or when one or more tires of the wheel assemblies 32, 48, 72, 88, 108 and 120 will require replacing.

Furthermore, as illustrated in FIG. 1 of the disclosure, the one or more vehicles 2 further include a Global Positioning System (GPS) 148. According to an embodiment of the disclosure, the GPS 148 is in communication with the onboard computer 136 and/or the onboard telematics unit 138 of the one or more vehicles 2 by using the onboard J-1939 communication network (not shown). In accordance with an alternative embodiment of the disclosure, the GPS 148 is in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The GPS 148 is used to match the path traveled by the one or more vehicles 2 with a known map system (not shown). By knowing what road(s) (not shown) the one or more vehicles 2 are driving on the onboard computer 136 is able to determine the type of road material the one or more vehicles 2 have been driving and how long the one or more vehicles 2 have been driving on that type of road material. Additionally, by knowing what road(s) (not shown) the vehicle is driving on, the onboard computer 136 is able to determine the slope or grade of the road(s) (not shown) the vehicle is driving on. When the one or more vehicles 2 are driving on a road having an incline and/or a decline, there is an increase in friction between the tires of the wheel assemblies 32, 48, 72, 88, 108 and 120 and the road (not shown). As a result, the rate at which the tires of the wheel assemblies 32, 48, 72, 88, 108 and 120 will wear will increase. This factor will also aid in providing a more accurate prediction as to when a tire failure will occur, when tire maintenance will be needed and/or when one or more tires of the wheel assemblies 32, 48, 72, 88, 108 and 120 will require replacing.

Still further, as illustrated in FIG. 1 of the disclosure, the one or more vehicles 2 may further include the use of one or more vehicle speed sensors 150. According to an embodiment of the disclosure, the one or more vehicle speed sensors 150 are in communication with the onboard computer 136 and/or the onboard telematics unit 138 of the one or more vehicles 2 by using the onboard J-1939 communication network (not shown). In accordance with an alternative embodiment of the disclosure, the one or more vehicle speed sensors 150 is in communication with the onboard computer 136 and/or the onboard telematics unit 138 of the one or more vehicles 2 by using a wireless connection. As a non-limiting example, the wireless connection may be a Bluetooth connection, Wi-Fi connection, electromagnetic wave connection, cellular connection, a radio connection, a wired connection and/or an optical connection.

The one or more vehicle speed sensors 150 are used to determine the speed of the one or more vehicles 2. The speed of the one or more vehicles 2 can be used to determine the amount of wear on the tires of the wheel assemblies 32, 48, 72, 88, 108 and 120 based on the amount of braking force applied on the wheel assemblies 32, 48, 72, 88, 108 and 120 by the braking systems 34, 50, 74, 90, 110 and 122. The higher the speed and the higher the braking force applied by the braking systems 34, 50, 74, 90, 110 and 122 the higher the amount of wear on the tires of the wheel assemblies 32, 48, 72, 88, 108 and 120 for that period of time. This factor will also aid in providing a more accurate prediction as to when a tire failure will occur, when tire maintenance will be needed and/or when one or more of the wheel assemblies 32, 48, 72, 88, 108 and 120 will require replacing.

In addition to the above discussed factors, a tread depth for the tires of the wheel assemblies 32, 48, 72, 88, 108 and 120 needs to be determined. The tread depth provides a baseline for the prediction as to when a tire failure will occur, when tire maintenance will be needed and/or when one or more tires of the wheel assemblies 32, 48, 72, 88, 108 and 120 will require replacing. As a non-limiting example, the tread depth for the tires of the wheel assemblies 32, 48, 72, 88, 108 and 120 can be determined by using a hand gauge, manufacture tire tread depth specification data and/or a laser sensor. It is within the scope of this disclosure, that the laser sensor may be onboard the one or more vehicles 2 and in communication with the onboard computer 136 and/or the telematics unit 138. According to an embodiment of the disclosure, the tread depth of the tires of the wheel assemblies 32, 48, 72, 88, 108 and 120 determined at the time the tires are installed on the one or more vehicles 2 and may be inputted into the onboard computer 136 of the one or more vehicles 2. In accordance with an alternative embodiment of the disclosure, the tread depth of the tires of the wheel assemblies 32, 48, 72, 88, 108 and 120 may be updated at pre-determined times throughout the life of the tires and inputted into the onboard computer 136 of the one or more vehicles 2. This factor will further aid in providing a more accurate prediction as to when a tire failure will occur, when tire maintenance will be needed and/or when one or more tires of the wheel assemblies 32, 48, 72, 88, 108 and 120 will require replacing.

Furthermore, the make, model, tread design and tread material of the tires of the wheel assemblies 32, 48, 72, 88, 108 and 120 also needs to be determined. The make, model, tread design and tread material are important factors in determining how the tires of the wheel assemblies 32, 48, 72, 88, 108 and 120 will wear and at what rate they will wear based on the above described factors. According to an embodiment of the disclosure, the make, model, tread design and tread material of the tires of the wheel assemblies 32, 48, 72, 88, 108 and 120 may be manually inputted into the onboard computer 136 of the one or more vehicles 2 at the time they are installed. In accordance with an alternative embodiment of the disclosure, the make, model, tread design and tread material of the tires of the wheel assemblies 32, 48, 72, 88, 108 and 120 may be scanned from the tires into the onboard computer 136 of the one or more vehicles 2. This factor will further aid in providing an accurate prediction as to when a tire failure will occur, when tire maintenance will be needed and/or when one or more tires of the wheel assemblies 32, 48, 72, 88, 108 and 120 will require replacing.

Figure 2:
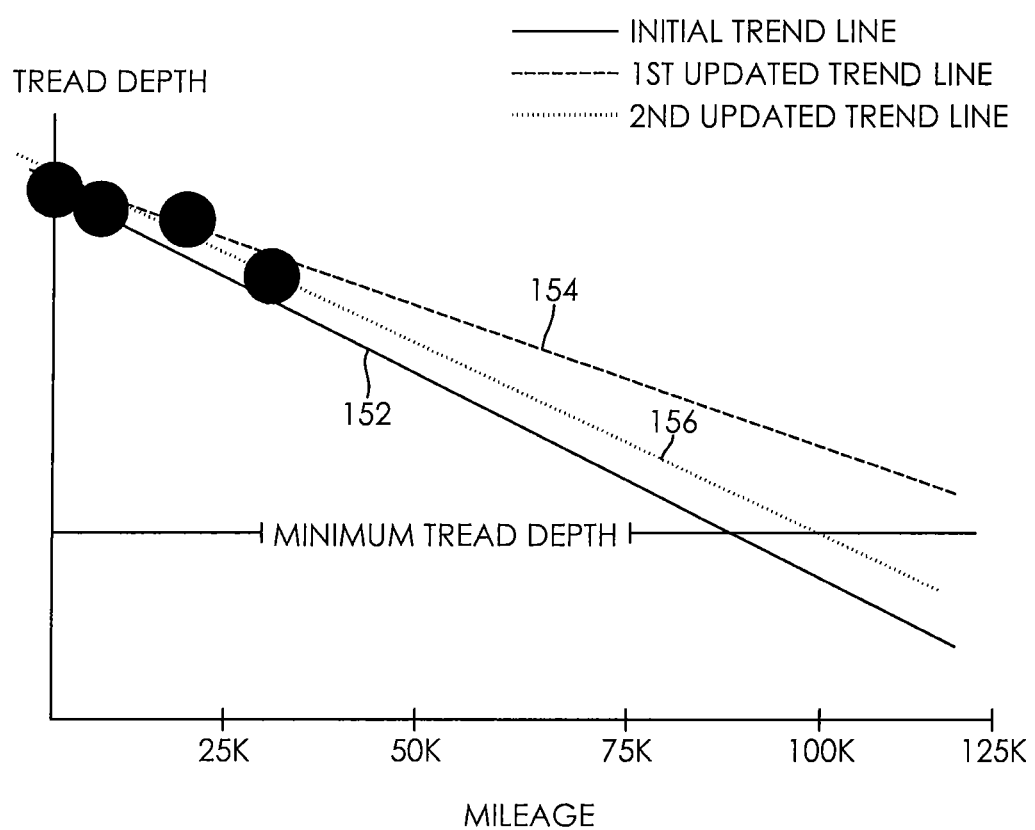
FIG. 2 is a plot illustrating a tread depth versus millage prediction method according to an embodiment of the disclosure.

FIG. 2 is a plot illustrating a tread depth versus millage prediction according to an embodiment of the disclosure. First, an initial baseline tread depth of the tires of the wheel assemblies 32, 48, 72, 88, 108 and 120 is determined by measuring the tread depth with the hand gauge, the manufacture tire tread depth specification data and/or the laser sensor. As time goes on, the onboard computer 136 of the one or more vehicles 2 collect and analyze data relating to one or more of the above discussed factors for predicting when a tire failure will occur, when tire maintenance will be needed and/or when one or more tires of the wheel assemblies 32, 48, 72, 88, 108 and 120 will require replacing.

At a pre-determined point in time after the tires of the wheel assemblies 32, 48, 72, 88, 108 and 120 are installed on the one or more vehicles 2, a second tread depth is determined by measuring the tread depth with the hand gauge and/or the laser sensor. Based on the new tread depth determined, a change in tread depth from the initial baseline tread depth can be determined. This is also known at the delta tread depth.

Once the delta tread depth is determined, the onboard computer 136 of the one or more vehicles 2 utilizes the data collected and analyzed relating to one or more of the above discussed factors over time to extrapolate a trend line into the future. As a result, this updated tread line estimates when the tread depth of the tires will fall below a pre-determined minimum tread depth. According to an embodiment of the disclosure, the onboard computer 136 of the one or more vehicles 2 then continuously updates the trend line based on new data collected and analyzed by the onboard computer 136. In accordance with an alternative embodiment of the disclosure, the onboard computer updates the trend line at pre-determined intervals throughout the duty life of the tires of the wheel assemblies 32, 48, 72, 88, 108 and 120. As time goes on, the prediction becomes more and more accurate.

When the duty life of the tires of the wheel assemblies 32, 48, 72, 88, 108 and 120 is within a pre-determined number of miles from the predicted number of miles when the depth of the tire tread will fall below the pre-determined minimum tread depth, a message is sent to the vehicle owner (not shown) and/or the vehicle operator (not shown). The message (not shown) alerts the vehicle operator (not shown) and/or the vehicle owner (not shown) that one or more of the tires of the wheel assemblies 32, 48, 72, 88, 108 and 120 is in need of repair and/or replacement. In accordance with an embodiment of the disclosure, the pre-determined number of miles may be 50 miles, 100 miles, 200 miles, 300 miles, 400 miles and/or 500 miles from the predicted number of miles when the depth of the tire tread will fall below the pre-determined minimum tread depth. It is within the scope of this disclosure that more than one message may be sent to the vehicle operator and/or owner (not shown) indicating which of the tires of the wheel assemblies 32, 48, 72, 88, 108 and 120 need replaced, which tires need repaired and/or how many miles till the tires require immediate replacement. By sending the vehicle owner (not shown) and/or the vehicle operator (not shown) the message estimating when one or more of the tires will need to be repaired and/or replaced it will allow the owner and/or operator to plan ahead for when the repairs or replacements will occur. This will allow the repair and/or replacements of the tires to be done at a time that is more convenient for the vehicle owner (not shown) and/or the vehicle operator (not shown), thereby limiting the amount of down time for the one or more vehicles 2 and saving money. As a non-limiting example, the message may be a text based message, a graphical message, an indicator light and/or an audible sound within the cab (not shown) of the one or more vehicles 2.

In accordance with the embodiment of the disclosure illustrated in FIG. 2, the initial trend line 152 is based on the initial delta change in tread depth that was measured. As illustrated in FIG. 2 of the disclosure, the initial trend line 152 indicates that the tread depth of one or more of the tires of the wheel assemblies 32, 48, 72, 88, 108 and 120 will fall below the pre-determined minimum tread depth at approximately 85,000 miles.

The initial trend line 152 is then updated to include the data collected and analyzed in relation to the outside ambient temperature of the one or more vehicles 2 and the amount of time the vehicle has been driving at those temperatures. This provides a first updated trend line 154. As illustrated in FIG. 2 of the disclosure, the first updated trend line 154 indicates that the tread depth of one or more of the tires of the wheel assemblies 32, 48, 72, 88, 108 and 120 will fall below the pre-determined minimum tread depth at a point 125,000 miles.

Once the first updated trend line 154 is determined, the first updated trend line 154 is then updated to include the data collected and analyzed by the onboard computer 136 of the one or more vehicles 2 in relation to the amount of time the one or more vehicles 2 have driven in rainy and/or snowy conditions. This provides a second updated trend line 156. As illustrated in FIG. 2 of the disclosure, the second updated trend line 156 indicates that the tread depth of one or more of the tires of the wheel assemblies 32, 48, 72, 88, 108 and 120 will fall below the pre-determined minimum tread depth at a point 100,000 miles.

Figure 3:
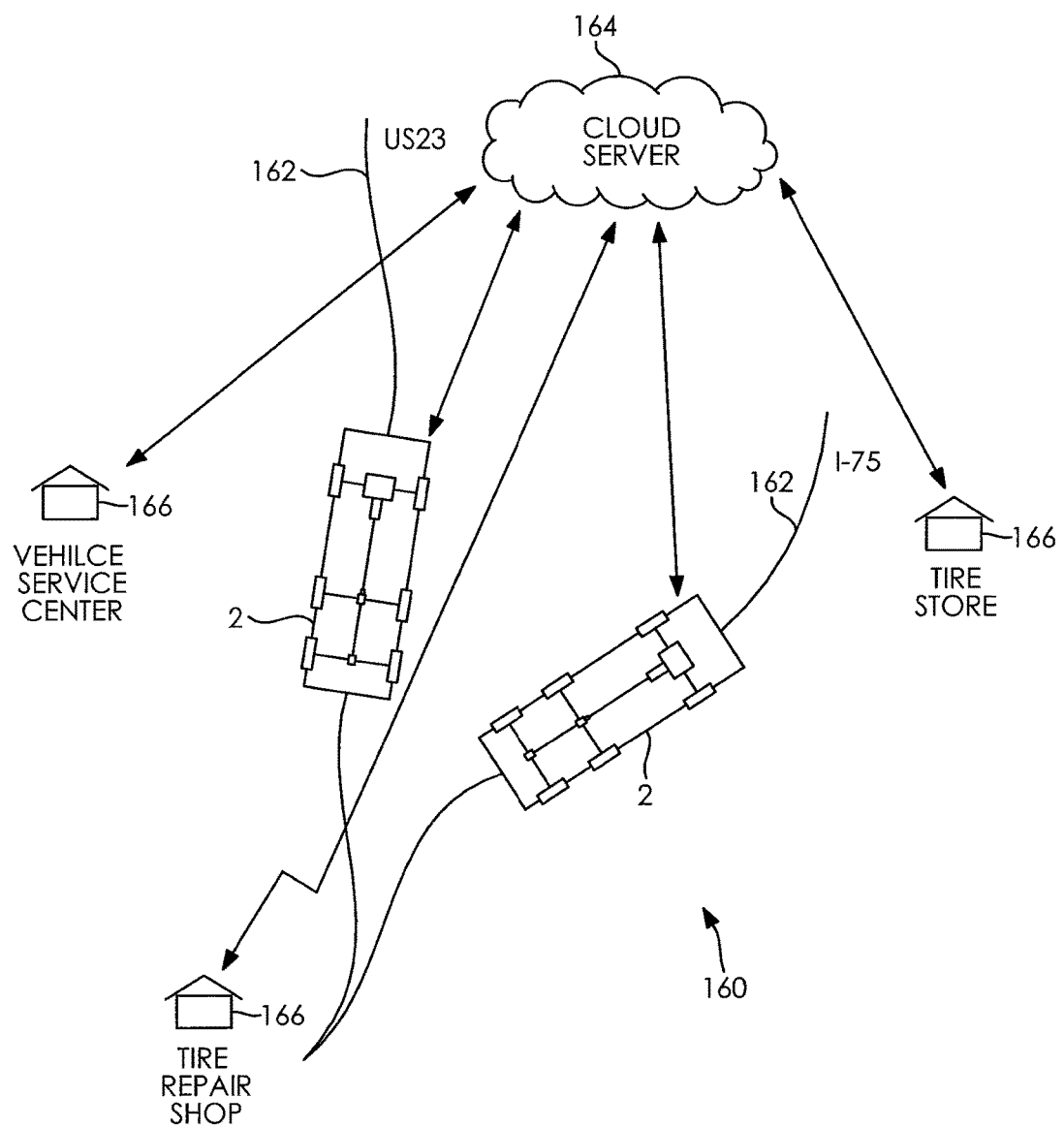
FIG. 3 is a schematic illustration depicting a tire condition telematics system 2 according to an embodiment of the disclosure.

FIG. 3 is a schematic illustration depicting a tire condition telematics system 160 according to an embodiment of the disclosure. As a one or more vehicles 2 travel along one or more segments of road 162, the one or more vehicles 2 may require service from time to time. As a non-limiting example, service required may be to fix one or more leaking tires, to fix one or more failing tires and/or to replace one or more failed tires. In accordance with the embodiment of the disclosure illustrated in FIG. 3 and as a non-limiting example, the one or more segments of road 162 may be United States (U.S.) route 23 and/or Interstate 75. It is within the scope of this disclosure that the tire condition telematics system 160 disclosed herein may be used in connection with any stretch of road and any road layout.

In accordance with the embodiment of the disclosure illustrated in FIG. 3, if the onboard computer 136 of the one or more vehicles 2 detects the occurrence of a tire leak and/or a tire puncture event, a signal is sent from the onboard computer 136 to the telematics unit 138. The telematics unit 138 then sends a signal to a cloud-based server 164 indicating which tire is leaking and/or punctured. Additionally, the signal sent from the one or more vehicles 2 to the cloud-based server 164 via the telematics unit 138 may further provide the geographic location of the one or more vehicles 2 with a leaking and/or punctured tire. According to an embodiment of the disclosure, the onboard computer 136 may automatically instruct the telematics unit 138 to send a signal to the cloud-based server 164 indicating that the one or more vehicles 2 have experiences a tire leak and/or a tire puncture event. In accordance with an alternative embodiment of the disclosure, the onboard computer 136, upon the detection of a tire leak and/or a tire puncture event, may send a message to the vehicle operator and/or owner (not shown) indicating the existence of a tire leak and/or tire puncture event and request permission to send a signal to the cloud-based server 164 requesting service. As a non-limiting example, the telematics unit 138 of the one or more vehicles 2 may communicate with the cloud-based server 164 by using a Bluetooth connection, Wi-Fi connection, electromagnetic wave connection, cellular connection, a radio connection, a wired connection and/or an optical connection.

Once the information related to the tire leak and/or tire puncture event is received by the cloud-based server 164, a signal may be sent from the cloud-based server 164 to one or more tire service providers 166 within a pre-determined serviceable radius from the geographic location of the one or more vehicles 2. It is within the scope of this disclosure that the signal include a request for a quote for repair and/or replacement along with the information relating to the tire leak and/or tire puncture event. The pre-determined serviceable radius is determined by the onboard computer 136 and/or the cloud-based server 164 based on how strong the leak is. As a result, the stronger the rate of the leak the fewer the miles the one or more vehicles 2 will be able to drive before the internal pressure of the wheel assemblies 32, 48, 72, 88, 108 and 120 falls below a pre-determined minimum air pressure. Likewise, the weaker the leak, the more miles the one or more vehicles 2 will be able to drive before the internal pressure of the wheel assemblies 32, 48, 72, 88, 108 and 120 falls below a pre-determined minimum air pressure. As a non-limiting example, the one or more tire service providers 166 may be a vehicle service center, a tire store and/or a tire repair shop.

When the signal is received by the one or more tire service providers 166 from the cloud-based server 164, the one or more tire service providers 166 can then send a signal back to the cloud-based server 164 providing their quote to make the necessary repairs and/or replacements to the tire(s) experiencing the tire leak and/or tire puncture event. As a non-limiting example, the quote may provide the amount of time needed to make the repairs and/or replacements, the costs for the repairs, the costs for the replacement tires, the types of tires they have for the replacement and/or how far the one or more tire service providers 166 are from the one or more vehicles 2.

Once the quotes from the one or more tire service providers 166 are received by the cloud-based server 164, the cloud based server 164 may send the quotes to the vehicle operators (not shown) and/or the vehicle owners (not shown). This will allow the vehicle owner (not shown) and/or the vehicle operator (not shown) to quickly choose the quickest and most cost effective tire service provider of the one or more tire service providers 166 thereby limiting the amount of down time for the one or more vehicles 2. By reducing the amount of down time for the one or more vehicles 2 the more money they can make.

In accordance with the embodiment of the disclosure where the onboard computer 136 predicts when a tire failure will occur based on the tire tread depth, a signal may automatically be sent to the cloud-based server 164. According to an alternative embodiment of the disclosure, when the message is sent to the vehicle operator (not shown) and/or the vehicle owner (not shown) indicating that a tire failure is imminent, the message may also include a request to send a signal to the cloud-based server 164 requesting service.

Once the signal is received by the cloud-based server 164 indicating that one or more of the tires of the wheel assemblies 32, 48, 72, 88, 108 and 120 needs replaced and/or repaired, the cloud-based system 164 may send a signal to the one or more tire service providers 166 within a pre-determined serviceable radius. It is within the scope of this disclosure, that the signal may include a request for a quote for repairs and/or replacement of one or more of the tires of the wheel assemblies 32, 48, 72, 88, 108 and 120. The pre-determined serviceable radius is determined by the difference between the amount of miles on the one or more tires of the wheel assemblies 32, 48, 72, 88, 108 and 120 and the estimated number of miles when the tread depth of one or more of the tires will fall below the pre-determined minimum tread depth.

When the signal is received by the one or more tire service providers 166 from the cloud-based server 164 the one or more tire service providers 166 can then send a signal back to the cloud-based server 164 providing their quote to make the necessary repairs and/or replacements to one or more of the tires. As a non-limiting example, the quote may provide the amount of time needed to make the repairs and/or replacements, the cost of the repairs, the cost of the replacement tires, the types of tires they have for the replacement and/or how far the one or more tire service providers 166 are from the one or more vehicle 2.

Once the quotes from the one or more service providers 166 are received by the cloud-based server 164, the cloud based server 164 may send the quotes to the vehicle operators (not shown) and/or the vehicle owners (not shown). This will allow the vehicle owner (not shown) and/or the vehicle operator (not shown) to quickly choose the quickest and most cost effective tire service provider of the one or more tire service providers 166 thereby limiting the amount of down time for the one or more vehicles 2. By reducing the amount of down time for the one or more vehicles 2 the more money they can make. Additionally, this will allow the vehicle owner (not shown) and/or the vehicle operator (not shown) to get the tires of the wheel assemblies 32, 48, 72, 88, 108 and 120 replaced and/or repaired before a catastrophic failure occurs resulting in excessive amounts of down time for the one or more vehicles 2.

Based on the large amount of data that the onboard computer 136 of the one or more vehicles 2 would need to store in order to predict when a tire failure will occur based on the tire tread depth, it is within the scope of this disclosure that the data may be sent to the cloud-based server 164 for analysis. As a result, according to this embodiment of the disclosure, the cloud-bases server 164 includes one or more data processors (not shown) that are capable of receiving, processing and analyzing the data received from the one or more vehicles 2. In accordance with this embodiment of the disclosure, the prediction as to when the tread depth of one or more of the tires will fall below a pre-determined minimum tread depth will performed as previously described except the analysis is performed by the cloud-based server 164 and not by the onboard computer 136 of the one or more vehicles 2. According to an embodiment of the disclosure, the one or more vehicles 2 may continuously transmit data to the cloud-based server 164 for analysis to predict when the tread depth of one or more of the tires will fall below a pre-determined minimum tread depth. According to an alternative embodiment of the disclosure, the one or more vehicles 2 may transmit data to the cloud-based server 164 are per-determined times for analysis to predict when the tread depth of one or more of the tires will fall below a pre-determined minimum tread depth.

Once the cloud-based server 164 determines that the tread of one or more of the tires will fall below the pre-determined minimum tread depth within the pre-determined number of miles, the cloud-based server 164 may automatically send a signal to the one or more tire service providers 166 within the pre-determined serviceable radius. It is within the scope of this disclosure that the signal may include a request for a quote for repairs and/or replacement of the one or more tires. In accordance with an alternative embodiment of the disclosure, the cloud-based server 164 may send a signal to the vehicle owner (not shown) and/or the vehicle operator (not shown) triggering a message indicating that a tire failure is imminent. It is within the scope of the disclosure that the message may also include a request to send a signal to the one or more tire service providers 166 requesting quotes.

While the present disclosure describes the tire condition telematics system 160 being used in connection with a tandem axle or heavy vehicle, it is within the scope of this disclosure that the tire condition telematics system 160 may be used in connection with any vehicle. As a non-limiting example, the vehicle utilizing the tire condition telematics system 160 may be a passenger vehicle, commercial vehicle, autonomous vehicle, semi-autonomous vehicle, hybrid vehicles, electric vehicles, hybrid electric vehicles or motor cycle.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. A method of predicting a tire condition, comprising:
providing a vehicle having one or more wheel assemblies, wherein said one or more wheel assemblies have one or more tires each with a tire tread;
providing an onboard computer having one or more data processors, wherein said one or more processors are operably configured to receive and analyze data from one or more sensors;
inputting an initial pre-determined tread depth of said tire tread of one or more of said one or more tires of said one or more wheel assemblies into said onboard computer;
determining an amount of distance traveled by said vehicle while said one or more wheel assemblies experience a wheel slip condition using a tire traction system;
determining an amount of distance traveled by said vehicle while said one or more wheel assemblies drive over one or more road materials of one or more roads using a lane tracking system, a Global Positioning System and/or a map system;
determining an amount of distance traveled by said vehicle while said one or more wheel assemblies drive over one or more road grades using said Global Positioning System and/or said map system;
determining an amount of distance traveled by said vehicle while said one or more wheel assemblies drive in rain;
determining an amount of distance traveled by said vehicle while said one or more wheel assemblies drive in snow, wherein said amount of distance traveled in said snow and/or rain is determined using one or more wiper system sensors;
determining an amount of distance traveled by said vehicle while one or more loads are on said vehicle using one or more pressure sensors; and
predicting when a tread depth of said tire tread of said one or more tires of said one or more wheel assemblies will fall below a minimum tread depth using said on board computer of said vehicle, wherein said prediction is determined by said initial pre-determined tread depth inputted, said amount of distance determined said one or more wheel assemblies have experienced said wheel slip condition, said amount of distance determined said one or more wheel assemblies have driven over said one or more road materials, said amount of distance determined said one or more wheel assemblies have driven in said rain, said amount of distance determined said one or more wheel assemblies have driven in said snow, said amount of distance determined said one or more loads are on said vehicle, said amount of distance determined said one or more wheel assemblies have driven over one or more road grades.

2. The method of predicting a tire condition of claim 1, further comprising the steps of: providing a vehicle telematics unit;

transmitting said prediction for when said tread depth of said tire tread of said one or more tires of said one or more wheel assemblies will fall below said minimum tread depth to a cloud-based server, wherein said transmission occurs when one or more of said one or more tires of said one or more wheel assemblies is within a pre-determined amount of distance from when one or more of said one or more tires of said one or more wheel assemblies has been predicted to fall below said minimum tread depth with said telematics unit of said vehicle;

receiving said prediction for when said tread depth of said tire tread of said one or more tires of said one or more wheel assemblies will fall below said minimum tread depth by said cloud-based server;

transmitting a request for a quote to, at least one of repair or replace, one or more of said one or more tires of said one or more wheel assemblies from said cloud-based server to one or more tire service providers within a pre-determined radius from a geographic location of said vehicle;

receiving said request for said quote from said cloud-based server by said one or more tire service providers;

transmitting said quote from said one or more tire service providers to said cloud-based server; and transmitting said quote from said cloud-based server to one or more vehicle owners and/or vehicle operators.

3. The method of predicting and communicating a tire condition of claim 1, further comprising the steps of: determining an ambient temperature said vehicle is traveling in; and using said ambient temperature said vehicle is traveling in said prediction for when said tread depth of said tire tread of said one or more tires of said one or more wheel assemblies will fall below a minimum tread depth.

4. The method of predicting a tire condition of claim 1, further comprising the steps of: measuring an internal pressure of one or more of said one or more tires of said one or more wheel assemblies of said vehicle;

determining an amount of distance one or more of said one or more tires have been driven with an internal pressure below a pre-determined optimal operating pressure; and using said amount of distance traveled by said vehicle while one or more of said one or more tires has had an internal pressure below said pre-determined optimal operating pressure in said prediction for when said tread depth of said tire tread of said one or more tires of said one or more wheel assemblies will fall below a minimum tread depth.

5. The method of predicting a tire condition of claim 4, wherein said internal pressure of said one or more tires is measured by using one or more pressure sensors.

6. The method of predicting a tire condition of claim 1, further comprising the steps of: determining an amount of braking force applied by one or more braking systems to said one or more wheel assemblies using one or more brake force sensors;

using said amount of braking force applied by said one or more braking systems to said one or more wheel assemblies determined in said prediction for when said tread depth of said tire tread of said one or more tires of said one or more wheel assemblies will fall below a minimum tread depth.

7. The method of predicting a tire condition of claim 1, further comprising the steps of: determining a speed of said vehicle when said braking force is applied to said one or more wheel assemblies by said one or more braking systems using one or more speed sensors;

using said speed of said vehicle determined when said braking force is applied to said one or more wheel assemblies by said one or more braking systems in said prediction for when said tread depth of said tire tread of said one or more tires of said one or more wheel assemblies will fall below a minimum tread depth.

8. The method of predicting a tire condition of claim 1, wherein said initial pre-determined tread depth inputted into said onboard computer is determined by measuring said tread depth of said one or more wheel assemblies by using a laser sensor, manufacture tire tread depth specification data, and/or a hand gauge.

9. A method of predicting a tire condition, comprising:

providing a vehicle having a telematics unit and one or more wheel assemblies, wherein said one or more wheel assemblies of said vehicle each having one or more tires with a tire tread;

inputting an initial pre-determined tread depth of said tire tread of one or more of said one or more tires of said one or more wheel assemblies into an onboard computer of said vehicle;

determining an amount of distance traveled by said vehicle while said one or more wheel assemblies experience a wheel slip condition using a tire traction system;

determining an amount of distance traveled by said vehicle while said one or more wheel assemblies drive over one or more road materials of one or more roads using a lane tracking system, a Global Positioning System and/or a map system;

determining an amount of distance traveled by said vehicle while said one or more wheel assemblies drive over one or more road grades using said Global Positioning System and/or said map system;

determining an amount of distance traveled by said vehicle while said one or more wheel assemblies drive in rain;

determining an amount of distance traveled by said vehicle while said one or more wheel assemblies drive in snow, wherein said amount of distance traveled in said snow and/or rain is determined using one or more wiper system sensors;

determining an amount of distance traveled by said vehicle while one or more loads are on said vehicle using one or more pressure sensors;

transmitting said initial pre-determined tread depth determined, said amount of distance determined said one or more wheel assemblies experienced said wheel slip condition, said amount of distance said one or more wheel assemblies have driven over said one or more road materials, said amount of distance determined said one or more wheel assemblies have driven over said one or more road grades, said amount of distance determined said one or more wheel assemblies have driven in said rain, said amount of distance determined said one or more wheel assemblies have driven in said snow, said amount of distance determined said one or more loads are on said vehicle, and said amount of distance determined said one or more loads are on said vehicle to a cloud-based server for analysis with said telematics unit of said vehicle; and predicting when a tread depth of said tire tread of said one or more tires of said one or more wheel assemblies will fall below a minimum tread depth, wherein said prediction is performed by said cloud-based server, wherein said prediction is determined by, said initial pre-determined tread depth inputted, said amount of distance determined said one or more wheel assemblies experienced said wheel slip condition, said amount of distance determined said one or more wheel assemblies have driven over said one or more road materials, said amount of distance determined said one or more wheel assemblies have driven in said rain, said amount of distance determined said one or more wheel assemblies have driven in said snow, said amount of distance determined said one or more loads are on said vehicle, and said amount of distance determined said one or more wheel assemblies have driven over one or more road grades.

10. The method of predicting a tire condition of claim 9, further comprising the steps of: transmitting a request for a quote to, at least one of repair or replace, one or more of said one or more tires of said one or more wheel assemblies from said cloud-based server to one or more tire service providers within a pre-determined radius from a geographic location of said vehicle;
   receiving said request for said quote from said cloud-based server by said one or more tire service providers;
   transmitting said quote from said one or more tire service providers to said cloud-based server; and
   transmitting said quote from said cloud-based server to one or more vehicle owners and/or vehicle operators.

11. The method of predicting a tire condition of claim 9, further comprising the steps of: determining an amount of braking force applied by one or more braking systems to said one or more wheel assemblies using one or more brake force sensors;
   transmitting said amount of braking force applied by said one or more braking systems to said one or more wheel assemblies determined to said cloud-based server for analysis with said telematics unit of said vehicle; and
   using said amount of braking force applied by said one or more braking systems to said one or more wheel assemblies determined in said prediction for when said tread depth of said tire tread of said one or more tires of said one or more wheel assemblies will fall below a minimum tread depth.

12. The method of predicting a tire condition of claim 9, further comprising the steps of: determining a speed of said vehicle when said braking force is applied to said one or more wheel assemblies by said one or more braking systems using one or more speed sensors;
   transmitting said speed of said vehicle determined when said braking force is applied to said one or more wheel assemblies by said one or more braking systems to said cloud-based server for analysis with said telematics unit of said vehicle; and
   using said speed of said vehicle determined when said braking force is applied to said one or more wheel assemblies by said one or more braking systems in said prediction for when said tread depth of said tire tread of said one or more tires of said one or more wheel assemblies will fall below a minimum tread depth.

13. The method of predicting a tire condition of claim 9, further comprising the steps of: determining an ambient temperature said vehicle is traveling in;
   transmitting said ambient temperature determined to said cloud-based server for analysis with said telematics unit of said vehicle; and
   using said ambient temperature determined in said prediction for when said tread depth of said tire tread of said one or more tires of said one or more wheel assemblies will fall below a minimum tread depth.

14. The method of predicting a tire condition of claim 9, wherein said initial pre-determined tread depth inputted into said onboard computer is determined by measuring said tread depth of said one or more wheel assemblies by using a laser sensor, manufacture tire tread depth specification data, and/or a hand gauge.

\* \* \* \* \*